(12) United States Patent
Comerford et al.

(10) Patent No.: US 6,513,009 B1
(45) Date of Patent: Jan. 28, 2003

(54) SCALABLE LOW RESOURCE DIALOG MANAGER

(75) Inventors: Liam David Comerford, Carmel, NY (US); Paul Derek Fernhout, Chappaqua, NY (US); David Carl Frank, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,961

(22) Filed: Dec. 14, 1999

(51) Int. Cl.$^7$ .............................................. G10L 21/00
(52) U.S. Cl. ..................................................... 704/270
(58) Field of Search .............................. 704/270.1, 270

(56) References Cited

U.S. PATENT DOCUMENTS

| | | | | |
|---|---|---|---|---|
| 5,488,569 A | * | 1/1996 | Kaplan et al. | 379/201.03 |
| 5,748,974 A | * | 5/1998 | Johnson | 704/9 |
| 5,850,629 A | * | 12/1998 | Holm et al. | 704/260 |
| 5,870,709 A | * | 2/1999 | Bernstein | 434/156 |
| 5,999,904 A | * | 12/1999 | Brown et al. | 704/200 |
| 6,044,347 A | * | 3/2000 | Abella et al. | 704/272 |
| 6,061,646 A | * | 5/2000 | Martino et al. | 379/88.06 |

* cited by examiner

Primary Examiner—Richemond Dorvil
Assistant Examiner—Michael N. Opsasnick
(74) Attorney, Agent, or Firm—Paul J. Otterstedt; Ryan, Mason & Lewis, LLP

(57) ABSTRACT

A spoken language interface between a user and at least one application or system includes a dialog manager operatively coupled to the application or system, an audio input system, an audio output system, a speech decoding engine and a speech synthesizing engine; and at least one user interface data set operatively coupled to the dialog manager, the user interface data set representing spoken language interface elements and data recognizable by the application. The dialog manager enables connection between the input audio system and the speech decoding engine such that a spoken utterance provided by the user is provided from the input audio system to the speech decoding engine. The speech decoding engine decodes the spoken utterance to generate a decoded output which is returned to the dialog manager. The dialog manager uses the decoded output to search the user interface data set for a corresponding spoken language interface element and data which is returned to the dialog manager when found, and provides the spoken language interface element associated data to the application for processing in accordance therewith. The application, on processing that element, provides a reference to an interface element to be spoken. The dialog manager enables connection between the audio output system and the speech synthesizing engine such that the speech synthesizing engine which, accepting data from that element, generates a synthesized output that expresses that element, the audio output system audibly presenting the synthesized output to the user.

44 Claims, 9 Drawing Sheets

FIG. 2

```
GLOBALLY AVAILABLE ELEMENTS

[dialog_manager]
root.voc
root.pmt
hardware_default.prf

[application_launch]
launch.voc

REGISTERED APPLICATIONS

[address_book]
addVappl.voc
addVappl.pmt
addres.prf

[memo_editor]
memVappl.voc
memVappl.pmt

[date_book]
datVappl.voc
datVappl.pmt
dates.fsg
times.fsg
```

| | |
|---|---|
| mic_type | 1 |
| enable_shutdown | 0 |
| power_time_out | 120000 |
| shut_down_beep | 1 |
| echo_commands | 0 |
| prompt_on_not_recognized | 1 |
| prompt_on_low_spoken_volume | 1 |
| | |
| start_up_gender | 0 |
| start_up_volume | 85 |
| start_up_speed | 75 |
| start_up_roughness | 10 |
| start_up_breathiness | 10 |
| start_up_headsize | 40 |
| start_up_pitchfluctuation | 50 |
| start_up_pitchbaseline | 65 |
| start_up_quality | 100 |

FIG. 6A

| | | |
|---|---|---|
| new | nw | null |
| scroll_up | su | 10 |
| scroll_down | sd | 10 |
| top | to | null |
| bottom | bo | null |
| next | nx | null |
| previous | pr | null |
| edit_entry | ed | null |
| done | ok | null |
| repeat | rp | 1 |
| list_all_entries | al | null |
| list_all_names | an | null |
| address_please | ad | null |
| address | ad | null |
| what_is_the_address | ad | null |
| continue | co | null |
| stop_reading | nop | x |
| find_homer_simpson | fi | simpson |
| find_Ed_Smith | fi | smith |
| find_David_Frank | fi | frank |

FIG. 6B

```
typedef struct
{
    char*   command_target;
    char*   spoken_command[CMDMAX];
    char*   command_string[CMDMAX];
    char*   data_string[CMDMAX];
    short   array_length;
} COMMAND_VOCAB;
```

```
empty           the_list_is_empty
nomore          there_are_no_more_items
attop           you_are_at_the_top_of_the_list
emptyaddress    there_is_no_address_for_this_entry
noneselected    no_entry_selected many            there_are_%1_people_named_%2_on_the_list
```

```
typedef struct
{
    char* index_string[PROMPTMAX];
    char* prompt[PROMPTMAX];
    short array_length;
} PROMPT_LIST;
```

FIG. 9A

```
SCRIPT UI FILES ARE INDEX LISTS OF SCRIPTS
verify_user      python     {verify}
begin_dictation  python     {dictation}
dial_phone       python     {phone}
greetings        simple     {greet}
problems         inline     say_"Houston,_we_have_a_problem!",Shutdown;
```

FIG. 9B

```
BOOL Verify_user()
{
    engine_manager.mic_button_means(user_verification_engine);
    text_to_speech.say("Please verify your identity by pressing the
                       microphone button and speaking your name.");
    ok = verification_engine.verify_user();
    engine_manager.mic_button_means(command_recognition_engine);
    return(ok);
}
```

FIG. 10

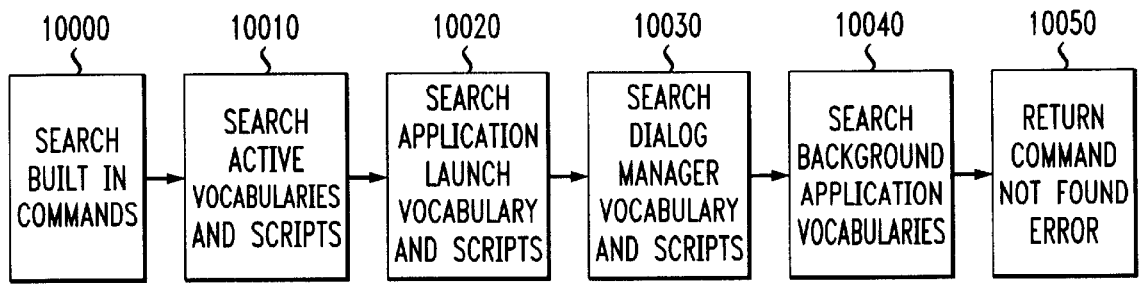

SCALABLE LOW RESOURCE DIALOG MANAGER

CROSS REFERENCE TO RELATED APPLICATIONS

The present invention is related to U.S. patent applications Ser. No. 09/460,077 entitled "Personal Speech Assistant", Ser. No. 09/460,913 entitled "Methods and Apparatus for Contingent Transfer and Execution of Spoken Language Interfaces", and Ser. No. 09/460,921 entitled "Methods and Apparatus for Synchronizing Voice and Text Data in Accordance with Computing Devices", all commonly assigned to International Business Machines Corporation, Armonk, N.Y. and filed concurrently herewith, the disclosures of which are incorporated herein by reference.

FIELD OF THE INVENTION

The present invention generally relates to user interfaces with computing systems and, more particularly to a spoken language user interface employing a dialog management system.

BACKGROUND OF THE INVENTION

Computer user interfaces are, historically, oriented toward paper and typewriter interaction metaphors. Pointing devices allow multiple sheets (graphical user interface or GUI windows) of specialized virtual "paper" to be addressed on a computer display. Recently, the state of the art in computer decoding of speech and encoding text into speech has progressed to the point that it is relatively easy to create text documents by dictating through a speech decoder into a text editing program and to have that or other documents read back aloud by encoding the document text into speech. An example of a commercial system supporting these capabilities is the IBM ViaVoice (a trademark of IBM Corporation of Armonk, N.Y.) product line. Since such decoders are capable of decoding a large spoken vocabulary, it is obvious that such decoding can be used for command language as well as text dictation.

Dialog management broadly refers to the sequence of exchanges between an application user and a software application in which the user is guided in providing information the application requires in order to accomplish some work desired by the user or some work required to further the program's operation.

Dialog management has been a routine part of graphical user interface (GUI) programming. Specific support for directed dialogs is an integral part of the Windows (a trademark of Microsoft Corporation of Redmond, Wash.) graphic shell. Dialogs are as a rule, presented as forms into which the user types information or from whose lists, the user makes selections. Given the space available on computer screens, all the controls and information data entry fields needed by an application or the computer operating system, can not all be displayed at one time. The dialog in the context of graphical user interfaces is thus primarily a screen space conserving mechanism.

Spoken Language Interfaces also conduct dialogs in order to further the interaction between the user and the application. They provide great conservation of screen space since they do not require screen presentation. Unlike GUI Dialogs, however, there exists only the most limited and rudimentary support for creating and managing the Spoken Language Dialog. Spoken Language Dialog management has largely been performed by the program logic of each application or by a global navigation program with features oriented toward selection of the active application and its presentation on screen.

It is important to distinguish Dialog Management from provision of Application Programmer Interfaces for the "engines" (such as a spoken command decoding engine) providing language related services. API's such as Microsoft's Speech Application Programmer's Interface and the JAVA consortium JSAPI interfaces only provide an abstraction of the engines' interfaces in order to allow application programs to operate regardless of the identity of the provider of the particular engines installed on a given user's system. This provides a common low-level interface for providing and accessing the services of engines, but leaves the creation and management of dialog to the individual applications accessing these low level interfaces.

SUMMARY OF THE INVENTION

The present invention provides an architecture for a spoken language dialog manager which can, with minimum resource requirements, support a conversational, task-oriented spoken dialog between one or more software applications and an application user. Further, the invention preferably provides that architecture as an easily portable and easily scalable architecture. The invention supports the easy addition of new capabilities and behavioral complexity to the basic dialog management services.

As such, one significant distinction from the prior art is found in the small size of the dialog management system. This size is consistent with the resources of modern embedded computing systems which are found in devices other than conventional "Personal" Computers or other purely data-processing systems. This invention may be applied equally easily to a computer used to operate a video cassette recorder (VCR) or a light switch or a Personal Digital Assistant (PDA). Given the teachings provided herein, one of ordinary skill in the art will realize various other applications.

In one illustrative embodiment of the invention, apparatus for providing a spoken language interface between a user and at least one application or system, wherein the apparatus operates in accordance with a computer processing system including a processor, an audio input system for receiving speech data provided by the user, an audio output system for outputting speech data to the user, a speech decoding system and a speech synthesizing engine, comprises: a dialog manager operatively coupled to the application or system, the audio input system, the audio output system, the speech decoding engine and the speech synthesizing engine; and at least one user interface data set operatively coupled to the dialog manager, the user interface data set representing spoken language interface elements and data recognizable by the application; wherein: (i) the dialog manager enables connection between the input audio system and the speech decoding engine such that the spoken utterance provided by the user is provided from the input audio system to the speech decoding engine; (ii) the speech decoding engine decodes the spoken utterance to generate a decoded output which is returned to the dialog manager; (iii) the dialog manager uses the decoded output to search the user interface data set for a corresponding spoken language interface element and data which is returned to the dialog manager when found; (iv) the dialog manager provides the spoken language interface element associated data to the application or system for processing in accordance therewith; (v) the application, on processing that element, provides a reference to an interface element to be spoken; (vi) the dialog manager enables connection between the audio output system and the speech synthesizing engine such that the speech synthesizing engine which, accepting data from that element, generates a synthesized output that expresses that element; and (vii) the audio output system audibly presenting the synthesized output to the user.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is an exemplary file registration list for use in accordance with one embodiment of a dialog management system according to the present invention;

FIG. 6A is a exemplary vocabulary data file for use in accordance with one embodiment of a dialog management system according to the present invention;

FIG. 6B is a exemplary vocabulary data structure for use in accordance with one embodiment of a dialog management system according to the present invention;

FIG. 9A is an exemplary script user interface file for use in accordance with one embodiment of a dialog management system according to the present invention;

FIG. 9B is a exemplary script file for use in accordance with one embodiment of a dialog management system according to the present invention;

FIG. 10 is flow diagram illustrating a search order associated with commands in one embodiment of a dialog management system according to the present invention.

DETAILED DESCRIPTION OF PREFERRED EMBODIMENTS

For the purposes of this description, consider a dialog management system of the present invention as a software component of a personal computer (PC). Such a PC may include a microphone and audio input system for collection of a person's speech, a loud speaker and audio output system for making output audible to the person, and a computer processing system built to support execution of at least a spoken command decoder, a text to speech encoder, and control and data connection to the PC. It should be understood by one of ordinary skill in the art that, while this example is described in the form of a PC software system, it may be applied to a whole range of devices, systems, locations, and appliances which incorporate or utilize computers, including but not limited to devices with embedded processors.

Figure 1A:
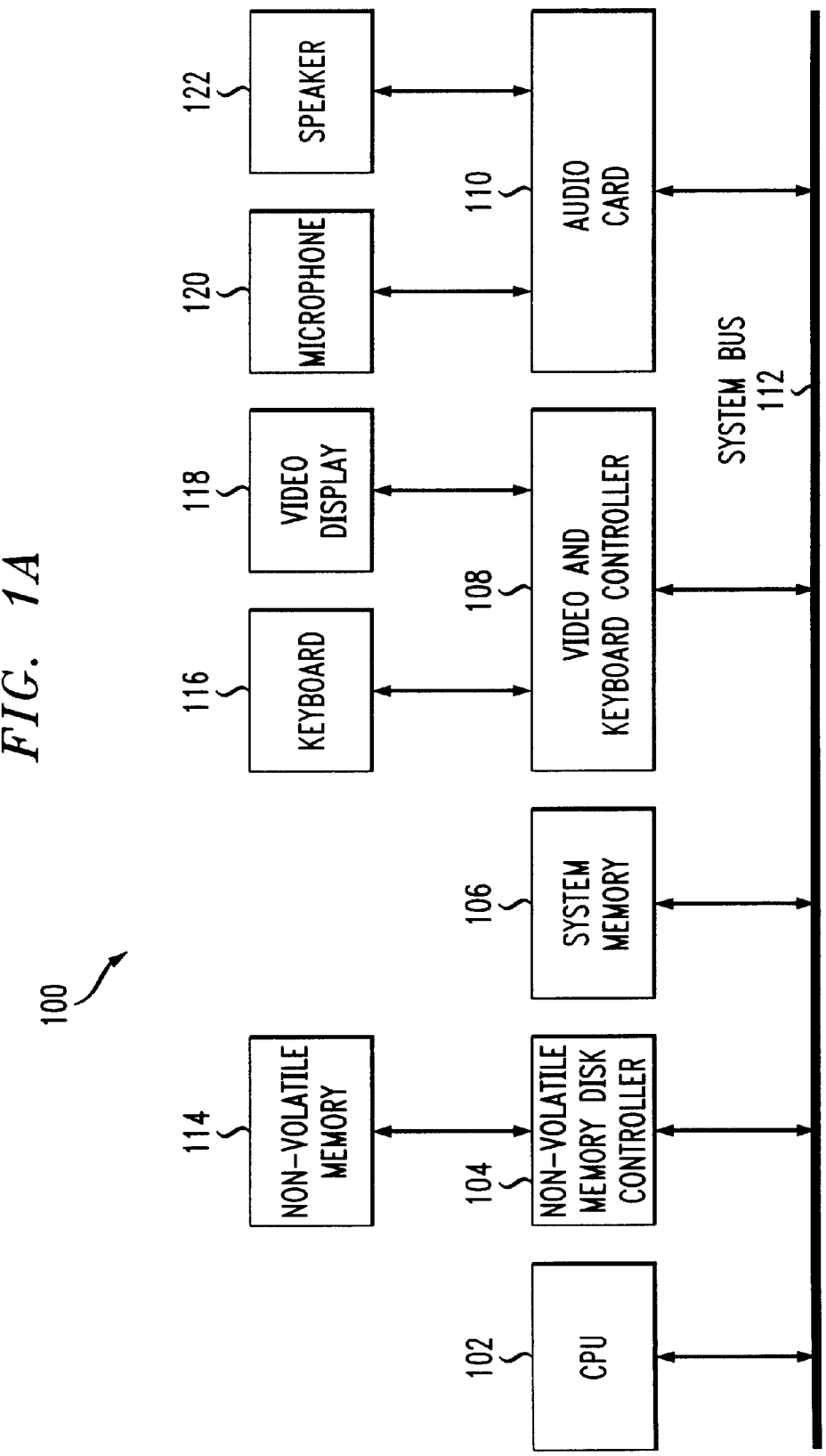
FIG. 1A is a block diagram illustrating one embodiment of a computing system with which a dialog management system according to the present invention may be employed.

Thus, by way of example, FIG. 1A illustrates an exemplary computer system 100 with which the dialog manager of the present invention may be employed. The computer system 100 includes: a central processing unit (CPU) 102; a non-volatile memory disk controller 104; a system memory 106; a video and keyboard controller 108; an audio card 110, all coupled by a system bus 112; a non-volatile memory 114 coupled to the disk controller 104; a keyboard 116 and video display 118 coupled to controller 108; and a microphone 120 and speaker 122 coupled to the audio card 110. It is to be appreciated that one of ordinary skill in the art will appreciate the functions of each of these components in connection with a computer system. As such, their operation and functions need not be further described. As mentioned, a dialog management system of the invention and related engines, as will be explained below in detail, may be executed in accordance with such a computer system. However, the dialog manager is not limited to this particular illustrative computer system.

A person, addressing commands to the PC or soliciting information or activity from the PC, is actually addressing a collection of more or less "intelligent" systems. This collection includes, typically, a set of software applications which each provide some specialized service to the user such as editing text files, displaying information from the World Wide Web, or maintaining an appointment data base.

Such a PC may be considered a hierarchy of components which may be addressed. It is possible to address commands to the dialog manager itself. One might say "speak faster" or "speak louder" or other commands meaningful to that component. Similarly, one may address the Operating System of the PC and tell it to start a particular application. An example might be "Editor," in which case the Operating System would be expected by the user to load a default editor (if it were not running already) and to give it the focus of the GUI system. Finally, one may address a particular application with commands addressing its capabilities. It should be understood by one of ordinary skill in the art that the number of levels in the hierarchy may be more or less than three depending on the particular requirements of the target device or system, and that the variant described here using a three level hierarchy is used for illustrative purposes only. Continuing the example above, the user may command that the application "open memo file," expecting the application to then utter. the title or reference line of each current member of the memo list in turn.

A spoken language interface may support as little spoken language capability as is provided by a speech to text decoder. In many cases, however, it will be desirable for such systems to be able to address spoken language to the user through means in addition to a text to speech decoding such as playback of recorded speech or spliced speech. Recorded speech may be that of the user or it may be recordings of any person. Sounds other than speech recording may be played to the advantage of the richness of the interface that can be created. Similarly, synthesized sounds may be used for functional purposes such as tone dialing or for enriching the interface as is the case with pneumonic devices such as the commonly used "earcons." Finally, other spoken language related capabilities such as recording, speech encryption, or user identification and verification may be included in a spoken language interface.

One purpose of this invention is to provide a simple, extensible, easily customized software system for integrating the capabilities of such spoken language interface engine components so that the interaction of the entire system with the person using the systems may proceed smoothly, supporting the subjective impression of the user that the system understands and is cooperating with the user's purpose or that if misunderstanding exists, it is cooperating in repairing the dialog. It should be understood however that the subjective impression of the user is an illusion and that no claim is made here to a software system which "understands" in the sense that a person understands an other's actions and intentions. Rather, an impression is created in the user's mind through the imitation of patterns of interaction which are consistent with common conversational conventions and the retention of some pieces of information across the boundaries of essentially discrete transactions.

Figure 1B:
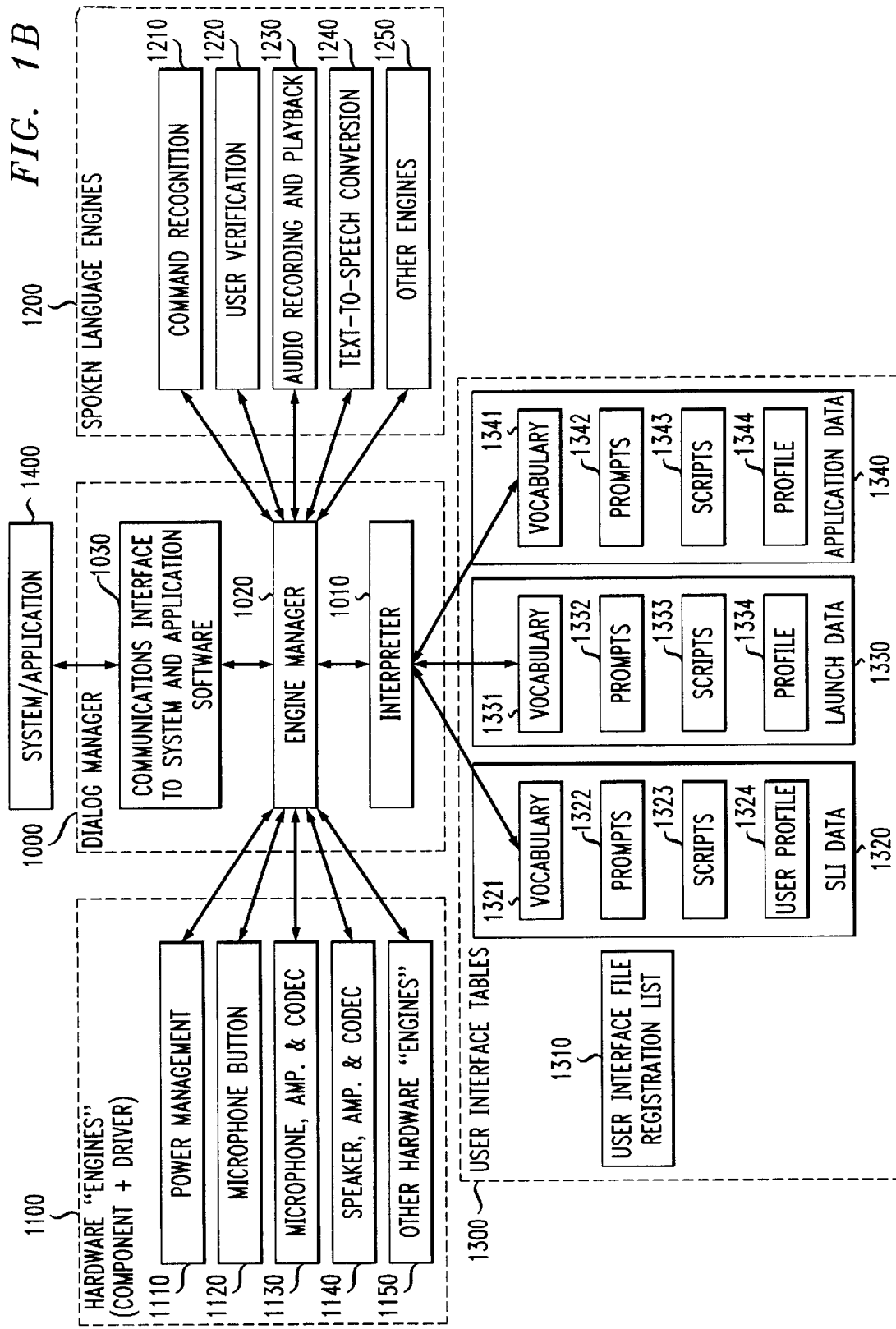
FIG. 1B is a block diagram illustrating one embodiment of a dialog management system according to the present invention.

FIG. 1B provides a high level view of the invention. The Dialog Manager 1000 contains two major components; an Engine Manager 1020 component and an Interpreter 1010 component. The Engine Manager 1020 component provides data and control connections to all components which may play a role in the spoken language interface. This includes software engines 1200 and "engines" 1100 comprising a hardware component and a software driver. Software engines may include, for example, a command and control speech decoding engine 1210, a text to speech encoding engine 1240, a recording and playback engine 1230, a user identity verification engine 1220, and other engines 1250 which may be required in particular implementations. Each of such engines has initialization and shutdown requirements and an Application Programmer's Interface through which the services of the engine may be obtained. Hardware engines may include, for example, power management devices 1110, a microphone button 1120, a microphone, amplifier and CODEC 1130, a speaker, amplifier, and CODEC 1140, and other hardware engines 1150 which may play a role in the spoken language interface. It should be obvious to one of ordinary skill in the art that engines which are not obviously related to spoken language may still play a role in a spoken language interface. Examples of such engines may include protocol managing engines for telephony or Internet connection, a tablet manager for hand writing support, or a cryptography engine for e-commerce support. Other engines will occur to those engaged in implementing instances of this invention. The method of adding engines either through a "plug-in" interface, a means well known to those skilled in the art, is one means of "scaling' the Dialog Manager. Engines may also be added by adding code to the Engine Manager component to support the new engine's properties. Both plug-in and code support result in an engine to engine-manager connection supporting standard messages.

The Engine Manager 1020 makes the services of the engines available through a messaging interface. Messages may be either commands to the engines (such as Say-This-Text) or reports from the engines (such as Playback-Completed). Commands may be common to all engines (such as Begin or Halt) or unique to the services the engine provides. Further, elements of the supported device (system and/or application 1400) may be treated as engines by the Engine Manager. Examples of these include push buttons which, through the medium of a software driver, can initiate "Button Pressed" or "Button Released" messages, LED lamps which may respond to "Turn-ON" or "Turn-OFF" messages, Power conditioning chips which can respond to "Turn-Off" messages or create "Power-Status" messages. Similarly, an "engine" providing communications services provides the means for transferring commands and data between the dialog manager and the applications or devices employing its services. This is shown as Communications Interface 1030 which provides such an interface to the system and/or application 1400 the user is employing the dialog management system of the invention with which to interact.

Accordingly, the dialog manager 1000 through the use of the hardware engines 1100, spoken language engines 1200 and user interface tables 1300 provides the user with a conversational spoken language interface with the system and/or application 1400. Mechanisms are provided to support "conversations" between the user and multiple devices including the profile feature allowing the sound of a given applications voice to be unique and the "target" value associated with each vocabulary 1321, 1331, 1341, or potentially each vocabulary entry.

The Interpreter component 1010 receives the messages created in the Engine Manager 1020 and uses them, in accord with its internal logic, to reference either its own hard coded instructions, or to reference the User Interface Data Tables 1300 provided by the application software to find appropriate instructions to send to appropriate or indicated targets. In the elementary case, the Interpreter component is a table driven interpreter. This supports a simple conversion of messages between the computing system's components and the user. In more advanced versions, other methods such as statistical or neural network or "fuzzy logic" methods may be applied to message conversion without departing form the spirit of the invention. Regardless of the means employed by the Interpreter to perform selection, the actions which it may select are determined by its collection of hard coded instructions and by the contents of the User Interface Tables initially provided by the software application writer.

There are four kinds of User Interface Tables which are employed by the Interpreter. These are vocabulary tables (1321 for Spoken Language Data, 1331 for Launch Data and 1341 for Application Data), prompt tables (1322 for Spoken Language Data, 1332 for Launch Data and 1342 for Application Data), hardware profiles (1324 for Spoken Language Data, 1334 for Launch Data and 1344 for Application Data), and scripts (1323 for Spoken Language Data, 1333 for Launch Data and 1343 for Application Data). Other types and forms of user interface data such as, for example, finite state grammars or other description of fragments of interface behavior may be employed in embodiments of this invention without departure from the spirit of the invention.

Given the overall description of component functionality provided above, an illustrative embodiment of a preferred dialog management system of the invention will now be described. Thus, let us consider the particular example cited above, in detail, in order to further understand the structure and operation of the invention. For this description, phases of operation and forms of dialog support will be treated in isolation to aid understanding.

Spoken Language Interface (SLI) Initialization

Spoken language user interface tables 1300, and spoken language engines 1200 are initialized at turn-on time in order to establish a default set of behaviors. The default behavior may by modified by any application or by the user.

In a PC environment, the values for initialization parameters may be stored in hard disk files. In other systems, they may be written in ROM memory or Flash Memory or any other conventional storage means including remotely connected databases and initialization servers.

User Interface Tables 1300 are initialized (in the PC environment) by parsing data files and storing the data in data structures by entirely conventional means. Similar actions can be performed using "flash memory" or ROM in embedded systems. In ROM based systems, the ability to update user interface data structures is limited. New applications are added to the collection of spoken-language-capable applications by adding at least one user interface file and by adding an entry in the user interface initialization file shown in FIG. 2. It should be understood that variations or alternatives to this method of initialization will occur to those of ordinary skill in the art and do not depart from the spirit of this invention.

Engines are initialized by calling parameter setting functions supported in the engine. In the case of button "engines" or other hardware related settings, these functions are located in the hardware device drivers.

The initialization process can now be described with reference to the figures. As previously mentioned, FIG. 1. shows a high level view of the dialog manager 1000 and its spoken language engines 1200, hardware engines 1100 and User Interface Data Files 1300.

The User Interface Data Table 1300 contains a File Registration List 1310 illustrated by the example in FIG. 2. This table contains two major sections, one listing files to be loaded into data structures for use with those parts of the user interface that are always present, i.e., those which address the spoken user interface and the application launch functions of the operating system, the other listing files that are to be loaded into data structures for use with those parts of the user interface which are present only when the specified application is active. Here, it should be understood that "application launch" refers to the stand function of an operating system in which the binary image of the application is loaded into working memory, if it is not already present, the operating system prepares a task, thread or other processor cycle resource to that application, and, subsequently makes all or some non-zero amount of processor execution cycles available to that application. Upon "launching" an application may be said to be "executing" or "active."

Conventional methods are used to load this registration file into a data structure in memory and then to use the information it contains to load each of the files it lists into their own data structures. As each vocabulary (1321, 1331, 1341) file is loaded, the name of the application using that vocabulary is stored in the "command_target" element of the data structure (FIG. 6B) allocated for each vocabulary. With these files in memory, the initialization can proceed to setting the default parameters of the Spoken Language engines 1200.

Default settings for the command recognition engine include, at least, loading it with or enabling the vocabularies SLI vocabulary 1321 and launch data vocabulary 1331. These default vocabularies are always available so that the user may speak to the dialog manager, which is always active, or to the operating system,.which is also always active, in order to change applications.

Among the User Interface Data files 1300, an SLI User Profile 1324 can be found. This profile contains data in the form of a table in which a data item name and a data item appear in pairs so that the correspondence between a data item name and a data item can be easily and unambiguously established. Such a data file is illustrated in FIG. 4.

Profiles are not always provided with an application. If a profile is not provided with an application, the dialog manager will treat the SLI profile as a default and use it's values. This makes the SLI profile the natural place to store user preferences. Further, a profile is not required to specify all settable hardware properties. It is unlikely, for example, that an author of a datebook application would be concerned about whether the microphone button operated as a push-to-talk button or a toggle-on-toggle-off button. Such an author may, however, wish to adjust the speech sounds of the text to speech engine in order to give a distinctive voice to that application. In the event that a profile item is unspecified in an application profile 1344, the values which are unfilled are chosen from the SLI user profile 1324. Finally, some profile value may be associated with the act of launching a new application, such as converting the microphone button to a toggle-on-toggle-off button and setting it to the on state.

Figures 3, 4:
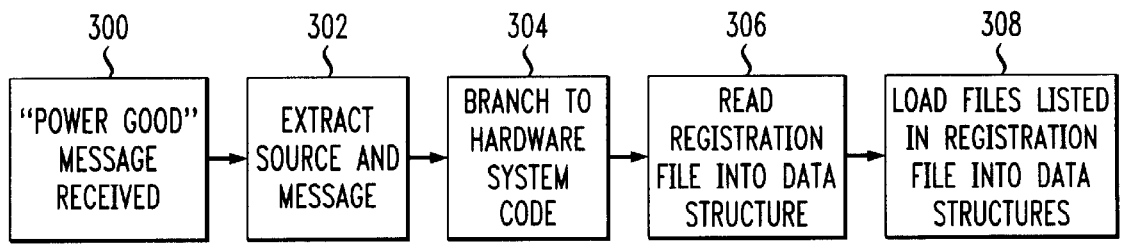
FIG. 3 is a flow diagram illustrating one embodiment of an initialization process of a dialog management system according to the present invention.
FIG. 4 is an exemplary user profile data file for use in accordance with one embodiment of a dialog management system according to the present invention.

Following the flow chart in FIG. 3, in step 300, the hardware power management component (1110 of FIG. 1) sends a "power good" event to the Engine Manager 1020. This event is formatted into a message containing the message source (the hardware power manager) and the message content, which is then placed into the message queue of the Interpreter 1010. It should be understood that the Interpreter message queue differs in no significant way from the conventional message or event queues commonly used in event driven programs. It also should be understood that the format of the messages created by the Engine Manager makes provision for more data fields than are used in this case. Further, it should be understood that the Engine Manager may make provision for data fields not included in this embodiment without departing from the spirit of this invention.

At this point in the operation of the invention, the Interpreter 1010 message queue is guaranteed to be entirely empty since the absence of power prior to this event precludes the generation of any messages. Since the message queue is scanned when the Interpreter 1010 is not otherwise busy, the "power good" message is unloaded from the message queue immediately. The Interpreter parses the message 302 using entirely conventional methods to extract the message source and the message content. The Interpreter compares the message source with a list of hard coded message sources (including hardware, engines, and applications), and, finding the message is from a hardware system, branches to its hardware system code 304. In a minimal implementation, this code can be implemented as a standard "C language" cascade of "if . . . else if" statements, which we will call a "hard coded" sequence of functions. Table driven methods, to be discussed below, may also be used for greater flexibility, but are not essential to the operation of the invention in the initialization phase since all user input to the process may be made through the data file of FIG. 4. The hardware system code 304, on receiving the power good message, parses the hardware profile shown in FIG. 4 by entirely conventional means, and for each parameter calls a function which sets that value 306 as the default value for that parameter for the appropriate engine. Examples of such parameter setting code may be found in the tool kit for IBM ViaVoice.

The aspects of spoken language dialogs which can be initialized also include, but are not limited to, microphone button type, audio output volume, and text to speech vocal track properties. Microphone button types include push-to-talk, toggle-on-toggle-off (microphone on or off) and push to toggle (on) with time-out (off). Voice operated microphone switches can also be supported and initialized with turn on or off keywords. Text to speech encoders such as the Eloquent Technologies system can be initialized with the speaker characteristics such as gender, volume, speed, roughness, breathiness, head size, pitch fluctuation, pitch baseline, and quality.

It should be understood that an additional profiles may be part of the UI data set of any application and that the values used in the application profile for a given application will be used to reinitialize engines when an application is made active.

On completion of the initialization of the of the Spoken Language engines 1200 and the working parameters of the Dialog Manager 1000, the hardware system code continues by loading 308 the remainder of the files in the User Interface Files 1300 data collection into conventional data structures. The form of examples of such files and their corresponding data structures are shown in FIGS. 6A and 6B for Vocabulary files and FIGS. 7A and 7B for prompt files, 1321, 1331, 1341. FIGS. 9A and 9B show a script user interface file and a sample script file.

Figure 5:
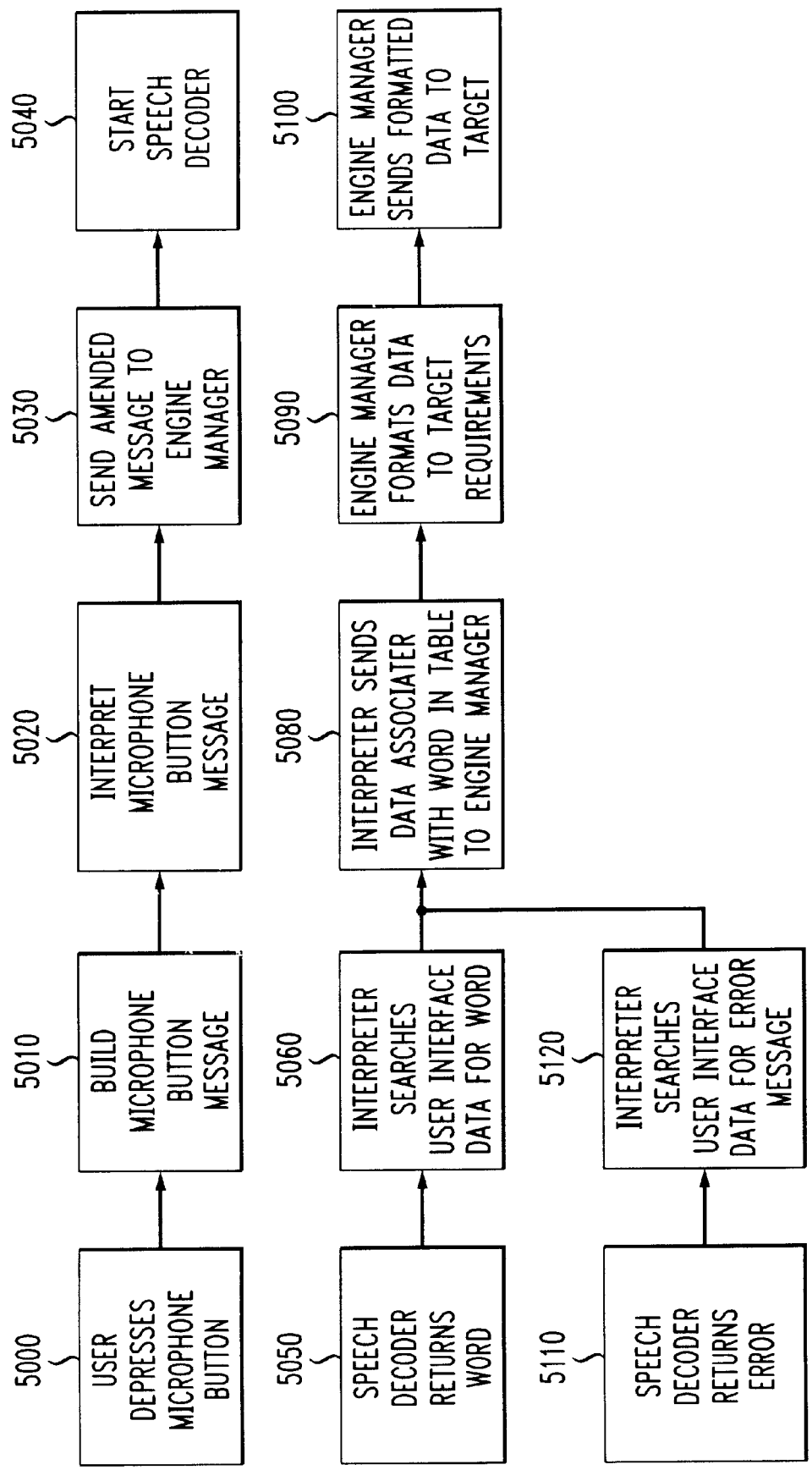
FIG. 5 is a flow diagram illustrating an example of a portion of a user transaction with a dialog management system according to the present invention.

Once initialization completes, the dialog manager 1000 is ready to support transactions which further the goals of the user. FIG. 5 shows the beginning of a transaction initiated by the user. The user begins by pressing the microphone button (5000). The button pressing event is reported via the button software driver 1120 to the Engine Manager 1020 which formats a message (5010) reporting the event parameters to the Interpreter 1010. The Interpreter 1010 examines data on the current state of the dialog with the user and, determining that no other activity is awaiting a microphone button message (5020), sends the message to the Engine Manager with the default target, e.g., the Command Recognition Engine 1210 (5030). The Engine Manager then formats the message into the form required by the Command Recognition Engine 1210 which, accepting the message, connects to the microphone through its amplifier, CODEC and software 1130 (5040).

The command recognition engine (also referred to as a speech decoder) operations are outside the scope of this invention which strives simply to provide an integration of the services of this and other engines in order to support the illusion to the user of attention and cooperation on the part of the addressed object such as the PC used in this example. In the normal operation of such engines, a status message is returned by the engine to the software system which initialized it. This status message may be either in the form of a recognized word (5050) or a error (5110).

In the case that a command word is recognized, it must necessarily be a word in a command vocabulary (1321, 1331, 1341) which was installed during the initialization process. A typical vocabulary is shown in FIG. 6A. For the sake of this example, assume that the user has said "Address book" which is a member of the application launch vocabulary 1331 called "launch.voc" indicated in FIG. 2. The list of "strings" stored in the set of vocabulary data structures of the form shown in FIG. 6B is searched (5060) by successively comparing the element "spoken_command" with the recognized word "address book." When the search returns, the index of the element (its position in the array) that was found is used to find the corresponding command and data elements in the command_string[ ] and data_string[ ] arrays, respectively. The identity of the vocabulary, i.e., launch.voc 1331, is used to establish the target of the command and data as the application launching system call, while the command to launch and the name of the application to launch are found in the command and data strings. In addition, initiating the processes of launching the application by sending a message to the Engine Manager, the Interpreter notes in its working memory, that the current application is the address book so that future recognized words will be searched for in the command vocabulary 1341 of that application. Similarly, the Interpreter activates the address book vocabulary in the command recognition engine 1210 so that it is capable of recognizing the command words listed in the user interface vocabulary files 1321, 1331, 1341.

It should be noted that the vocabulary file system permits any number of spoken commands to correspond to the same command and data. This allows the creation of synonyms for command words or phrases to improve the recognition accuracy obtained by a given user or simplify the user's task in memorizing the command set. This is illustrated in FIG. 6A where the spoken commands "address," "address please," and "what is the address," each has the same associated command and data, and hence produces the same sequence of events when recognized.

Continuing with the example, assume the user depresses the microphone button and says "find smith." The process depicted above repeats, following steps 5000 through 5100 of FIG. 5, as before, and finds the string "find smith" in the data structure typical of FIG. 6B containing the particular data shown in FIG. 6A. The Interpreter is now able to use the identity of the source vocabulary 1341 to identify the target as the executing application "Address Book" and to send it the command "find smith" through any conventional command channel 1030 of the kind used by those of ordinary skill in the art to implement inter process communication in computing systems. The address book application, having been supplied with a command and the data needed to execute that command can then find and return the information on "smith." The structure of such applications is known to those of ordinary skill in the art of programming applications and is outside the scope of this invention.

Thus, the above-described portion of this process is further illustrated in FIG. 5. Once the speech decoder 1210 returns the recognized word (5050), the Interpreter 1010 searches the User Interface Data 1300 for the word (5060). In the case where the speech decoder returns an error (5110), the Interpreter 1010 searches the User Interface Data 1300 for the appropriate error message (5120). In either case, the Interpreter sends the data associator with the word (or error message) in the table to the Engine Manager 1020 (5080). The Engine Manager formats the data to the appropriate target requirements (5090), e.g., in the case of the recognized phrase "find smith," the requirements of the Address book software application. The Engine Manager then sends the formatted data to the target (5100).

Figures 7A, 7B, 8:
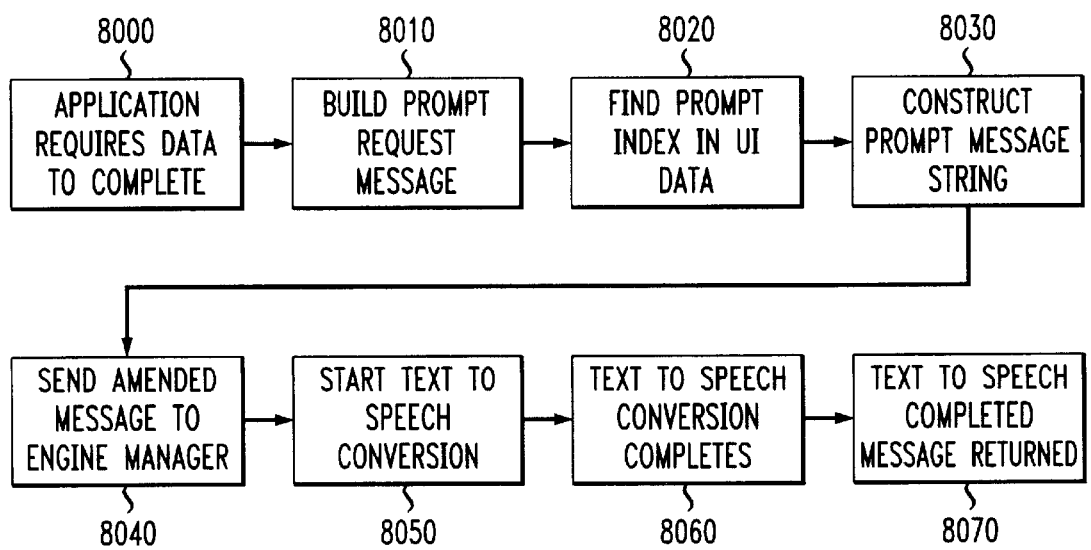
FIG. 7A is a exemplary prompt data file for use in accordance with one embodiment of a dialog management system according to the present invention.
FIG. 7B is a exemplary prompt data structure for use in accordance with one embodiment of a dialog management system according to the present invention.
FIG. 8 is a flow diagram illustrating an example of another portion of a user transaction with a dialog management system according to the present invention.

Continuing this example, assume that there are more than one persons named "Smith" listed in the address book application data base. In an application written for use with a GUI, the GUI might return a GUI dialog displaying a list of persons named "Smith" in order to get the information (which Smith) that it needs to complete servicing the user command. Referring now to FIG. 8, an example is provided for the process employed by the Spoken Language Interface Dialog Manager of the invention to handle this occurrence. Thus, it is determined that the target application requires data to complete servicing the user command (8000). An application written to take advantage of a Spoken Language Interface Dialog Manager could, in addition, send a message (8010) through the Communications Interface 1030 to the Interpreter 1010. This message, as with the message from the Command Recognition engine 1210, contains a data field giving the source of the message as a software application. The command content of the message is, in service to the application's purpose, a request to the Interpreter to "play" a prompt from the User interface prompt data file 1341. In the case of this example, the prompt requested is identified as "many." Using a search procedure identical to the one described above for vocabulary search, the index value associated with the prompt index string ("many") is found (8020) in the data structure containing the prompt data 1341 (FIG. 7A) for the current application (FIG. 7B), and the prompt string is found at the same index value of prompt_array of the same data structure.

Next the Interpreter examines the string. If no escape characters (such as %1 or %2) are found in the string, the job of formatting the string is completed (8030) simply by finding the string. In the case of the address book prompt "many" in this example, two escape characters are found. These may be supplied in the data segment of the message which was originally received from the software application. These values can then be inserted into the prompt string to replace the corresponding escape characters, completing construction of the prompt string (8030). Many alternative methods for supplying this data will occur to those of ordinary skill in the art without departing from the spirit of the invention, for example, using a sequence of messages to write data to scratch pad variables maintained in the working memory of the Interpreter prior to sending the prompt message.

An additional feature of the prompting system allows the Dialog Manager 1000 to provide instruction and queue user responses in a manner which helps support the illusion of understanding and cooperation. In the course of operation, the user may be required to perform activities, such as recording dictation, which require that the user follow a procedure. The Interpreter maintains an internal data set in which data on the date and time at which each procedure was last performed, as well as a count of the number of times the procedure was performed in the past is stored. By means of a simple policy, the user's experience is scored and a prompt is chosen from a set of prompts with varying amounts of detailed instruction based on that score. Thus, if the user has recently used the procedure, the prompt may merely say "Ready," while if the accumulated experience isn't great or recent, a more detailed prompt may be selected. This system of prompts can operate in the opposite direction in selected cases. For example, if the user says "Help" and the Dialog Manager replies with a short prompt like "Say the name of the application," the user's second request for "Help" following closely on the first could cause more complete prompts and guided activity. The "script" capability described below may be used within the Dialog Manager or a given application to support this capability. A detailed description and illustrative flow diagram of such a novel tapering feature using prompts will be explained below in the context of FIG. 11.

Continuing, having completed the prompt string, the string is included in a message from the Interpreter, sent to the Engine Manager, and targeted at the Text to Speech (TTS) Conversion engine 1240 (8040). The Engine Manager then halts, as part of its normal operation, any engine activity which may be using resources needed by the Text to Speech Converter. The TTS engine is then made to convert the string into audible synthetic speech (8050) using the CODEC amplifier, and speaker driver 1140 connection supplied by the Engine Manager 1020. Upon completion of the Text to Speech conversion (8060), a message is generated by the Engine Manager (8070) which is returned to both the Interpreter- and the software application. This message alerts the Interpreter that the resources it had reserved for the TTS operation can be made available to for other operations. The message informing the software application that the TTS operation is complete allows it to proceed to other Spoken Language Interface operations which may be required to serve the user's purposes.

The mechanisms which support the partial dialog described above are not observed by the user. Rather, in all the activity described above, the user only knows that after pressing the microphone button and asking for the address book, the address book application appeared and began to function, and that after pushing the microphone button and saying "find smith" the PC replied meaningfully by saying (for example) "there are five people named smith on the list." Supporting prompt, meaningful responses to commands supports the impression of the user that the system understands and cooperates. Returning for a moment to step 5110, it may occur that the Command Recognition engine is unable to find the word that was spoken in its vocabulary 1321 or, determined that, although the microphone button had been depressed, the volume of sound it received through the microphone connection was insufficient. In such an event, an error message rather than a recognized word is sent to the Engine Manager. As in the previous parts of this example, the Engine Manager formats a message to the Interpreter containing the source of the message and the data identifying the error. This event is fundamentally the same as the case shown in FIG. 8 in which an application requires data to complete, except that the prompts which are accessed are indexed by the error type and stored in the globally available part of the User interface data files. The system might, depending on the specific content of the prompt files, say "Please speak louder" in response to a low volume error, or "Please use command words" in response to a word not recognized error. By these means, the user is given the impression that the system is cooperating in trying to keep the dialog in a working state.

It should be obvious to one of ordinary skill in the art that the mechanism of targeted vocabularies, prompts, scripts and engine management described above is applicable to addressing targets other than a software application resident in the same computing system. The user may, if vocabularies and prompts are supplied, address the dialog manager itself, changing initialization parameters such as the speed of synthesized speech by means of a spoken command, such as "speak slower." This further supports the illusion of understanding on the part of the dialog manager.

Shortcuts

In the normal course of application use, the user may find that some service or piece of information provided or managed by an application other than the current application, is needed in order to further some task. As described thus far, a command word returned by the command recognizor is searched for first in the current application vocabulary 1341, then in the application launch vocabulary 1331, then in the dialog manager vocabulary 1321. Failing to find the word returns an error which is spoken to the user through, for example, the text to speech encoder. It is possible to operate the dialog manager using a variant of this approach in which the error message is not returned until all command vocabularies have been search and the word is found to be absent from all. In the event that the word is found in the vocabulary 1341 of an application which is not active, and the supporting operating system allows multitasking, the Interpreter may provide a sequence of messages to the Operating System through the medium of the Engine Manager 1020 and the Communication Interface 1030 which cause the application named in the command_target field of the data structure in which the command word was found to execute and return the data or service requested. Such a sequence of commands may be described in a file called a script. Many scripting languages are commonly in use in the computing world today including, for example, Pearl, Python, and JAVA Script, any of which could be used with appropriate software support in the Interpreter.

Scripts for other purposes may also be written for complex services required within a given application and invoked by messages from executing applications. This is another example of scaling the Dialog Manager. FIG. 9A shows a script user interface file and FIG. 9B shows an example of a script pseudo-coded in a "C" like syntax. An application calling this script would cause the sequence of dialog manager services to be executed in order. Thus, the Engine Manager 1020 would first be told to direct microphone button messages to a user verification engine 1220 which can recognize the voice of a particular user rather than the words which the user speaks. Such engines are commercially available and are outside the scope of this invention. The text to speech engine is then made to speak instructions to the user. The user, following instructions, depresses the microphone button, causing the user verification engine to execute through a sequence of events fundamentally similar to those for command word recognition except that the variable "OK" is set to the Boolean value "true" or "false" before being returned to the calling application. Before the value is returned, the Engine Manager is restored to its default condition in which the microphone button messages are routed to the command recognition engine.

While a preferred method for providing scripts to the user interface is through the script user interface file and data structure methodology, scripts may also be provided or referenced in vocabulary user interface files and data structures. This feature allows a simple user interface design to be incrementally improved or adapted and leaves the decision to separate scripts from simple commands up to the user interface programmer. In the normal course of events, scripts are named in the data area of a vocabulary entry and are found by de-referencing the script from that index in the script user interface data file. FIG. 9A shows such a file in which scripts are given an index string (in the first column), a target interpreter (in the second column) and a script file name or in-line encoding (in the third line column).

Script files are text files containing a program in a scripting language (for example "Python"). When a vocabulary word is recognized by the command recognition engine 1210 and the recognized word is found in an active vocabulary 1341 file by the interpreter 1010, the associated command may be "python" and the associated data may be the name of a file surrounded by brackets ("{" and "}" for example). In this case, the interpreter, finding the "python" command extracts the name of the file and, through the normal mechanisms of the dialog manager, starts the script interpreter engine, which, loads and executes the script file. The interpreter engine is able to access all functions and capabilities of the dialog manager and its engines so that application programmers are able to create any complexity of conversational behavior which can be created in a program. Alternatively, small python programs can be included as data in a vocabulary (1321, 1331, 1341) file, in which case the python engine is sent the program itself rather than file reference case. This is made distinguishable to the interpreter 1010 by using the command "run," for example, rather than "python."

Many software applications which employ spoken language in their interface may need to make or play recordings. A playback and recording engine 1230 is therefore a logical addition to the set of spoken language interface engines. Unlike text strings stored in prompt files or vocabulary files (1321, 1331, 1341) containing spoken word to command and data correspondences, the data created by and used by such an engine consists of large data sets formed in, for example, a pulse code modulated (PCM) format. Such data sets are stored in files so that reference can be made to them by file name. If a file is provided as part of an application or is created or obtained by an application, that application knows the name of the file. The application can call on playback and other services of the Dialog manager by issuing commands that are built into the Interpreter. The Interpreter, on receiving a message which has the an origin in the Communication Interface 1030, searches its list of built in commands instead of its vocabulary files (1321, 1331, 1341) to find the required action. This list of commands will typically contain, but need not be limited to, playback(a named file), say(a text string), record(a new file name).

The Interpreter is also able to process commands which do not produce an immediate effect that is immediately perceivable to the user. These include commands generated by the Interpreter and accepted by the Interpreter. An example of an Interpreter generated command is found in power management support. Since the Interpreter is "aware" of which Spoken Language Interface engines are in use at any given time, it is in a unique position to contribute to the power management activities of the system containing it. An example of this could be turning off audio output power amplifiers while the Command Recognition engine is active or more generally when no service such as Text to Speech or Recording Playback needs the amplifier capability.

One of the most important examples of such commands accepted by the Interpreter is that of "Add New User Interface" in response to which the Interpreter causes a new entry to be made in the application list of FIG. 2 and a new set of UI Data Structures to be allocated and initialized. It should be obvious to one of ordinary skill in the art that having user interface data stored either in files or in data structures, this data can be modified either adding, appending or deleting elements, and that this may also be an action for which a "hard coded" command is provided in the dialog manager.

Similarly it is possible to scale the size and capabilities of the dialog manager by other means. Engines may be added or removed through conventional means such as provision of a plug-in interface in the engine manager components, or adding code to the engine manager to support some alternate set of engines. That set may contain a larger or smaller number of engines, hence scaling the dialog manager. Thus, the dialog manager is scaled by three fundamental methods: adding or removing user interface files, adding or removing service or hardware engines, and adding or removing script files.

The order in which the Interpreter searches for the correct response to a command is shown in FIG. 10. A command may be one of those built in to the Interpreter (10000), e.g., reserved words, in which case the Interpreter executes the built in function selected by the command. In the absence of a built in command, the vocabularies are searched in order from the active application (10010)1341 to the application launch vocabulary (10020) 1331 to the Dialog Manager vocabulary (10030) 1321. Finally, if the particular environment and implementation supports background tasks, the possible background application vocabularies are searched (10040) and the required application launched as a background task. Here, it is to be understood that all applications discussed up to this point have been, in the common language of computer programmers of ordinary skill, "foreground" tasks and that most modern operating systems also provide the resource of "background" tasks. This distinction in multitasking systems reflects the presentation of the application window in the window order or target of address of user input devices. Data accessed by or created by a background task may be made available to a foreground application or the operating system through such means as shared memory or pipes or other means well know to those of ordinary skill in the art of programming applications under multitasking operating systems. Failing to find the command, the Interpreter can send itself the command to play the command-not-found prompt (10050).

Figure 11:
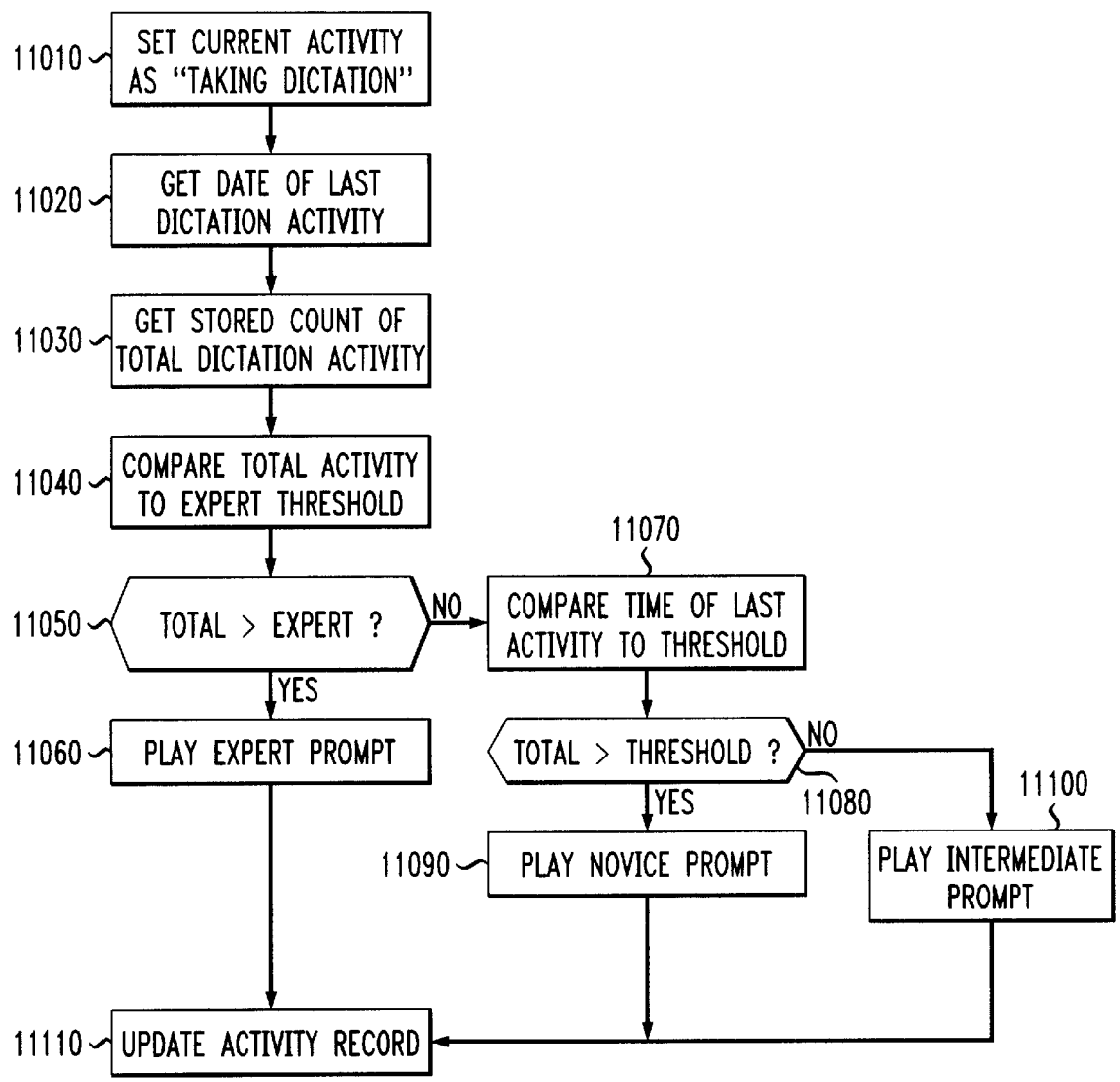
FIG. 11 is a flow diagram illustrating an example of a prompt policy in accordance with one embodiment according to the present invention.

Referring now to FIG. 11, a novel tapering feature using prompts in accordance with the dialog manager of the present invention will now be described. In the normal course of computer operation, a user may need to receive instructions on the best way to proceed. If the user has never encountered some feature of the software or some particular operation, the user may need to receive relatively detailed instructions. Similarly, if a long period has passed since some feature has been used, more detailed instructions may be needed than if the user had operated the feature recently. Obviously, the total experience the user has with a feature also affects the amount of information that must be included in a prompt.

The dialog manager described herein preferably includes a feature which selects among a collection of prompts which are graded in terms of the detail they contain so that, as the user operates the system, they will be given guidance which matches the amount of experience they have with a given feature and the time since they last used that feature.

For the sake of this discussion, let us consider an example which is directly related to the dialog manager features, that is, the use of recording. A user, wishing to record a segment of dictation would be expected to depress the microphone button and say "begin dictation." The microphone button closure, and utterance are handled by the dialog manager by the already described means. Finding the utterance "begin dictation" in a user interface vocabulary file targeted at the dialog manager itself, the associated command and data is returned to the dialog manager. On receiving the new command, the dialog manager may cause a script to execute or it may find the command in its hard coded instructions. Such a script would, by reason of its function, be essentially the same as the hard coded instruction, and is shown in FIG. 11.

As shown in FIG. 11, step 11010, on receiving the command "begin dictation," the dialog manager changes the current activity data to reflect that it is now taking dictation so that all activities which may use the same resources can be halted, as is normal in the course of dialog manager activity.

In step 11020 and step 11030, data items reflecting the user's experience with the dictation function are retrieved from the dialog manager user data. This data is stored in the user interface profile data structure in variables set aside in that structure for the purpose of recording user experience parameters. In this case, the parameters reflect, typical of such parameters, the total number of times the user has operated a feature (up to expert threshold+1) and the date the feature was last used. Other "policy" data may be used and other policy algorithms may be implemented without departing from the spirit this invention.

In step 11040, the value of the variable reflecting the user's total experience (at a rate of one count per use) is compared in step 11050 with the threshold supplied in the profile. If the user's experience exceeds the expert threshold, the expert prompt is selected and played in step 11060. If the user's experience is less than expert, then the time since the last use is calculate in step 11070 and, in accordance with step 11080, either the novice prompt is played (step 11090) or the intermediate prompt is played (step 11100) depending on whether the time since last use exceeds the threshold value provided in the profile.

Prompts at differing levels of expertise may be stored in an extended version of the prompt data structure in which an integer is associated in addition to the standard prompt index. This allows the dialog manager to select among the set of prompts according to a policy such as the one described above.

Once a prompt has been started, the data concerning user experience is updated in step 11110 to reflect the current date and, assuming expert status has not been reached, the fact that one more use has occurred.

Another advanced feature of the dialog manager related to the selection of prompts is the capacity of the dialog manager to select among a collection of prompts meaning the same thing. This, as observed in the user interface work of Nicole Yankelovich (see, e.g., N. Yankelovich, G. Levow and M. Marx, "Designing Speech Acts: Issues in Speech User Interfaces," Conference on Human Factors in Computing Systems CHI'95 (1995)), prevents the system from irritating the user by saying the same thing over and over. While Yankelovich used a prompt taper, that taper was one of increasing information in the prompt in response to the user demonstrating continuing difficulty with a feature. This method is the opposite of the method disclosed here in which long term information about the user experience is maintained to support a pneumonic approach (stimulate the memory of the full instruction) rather than a pedagogical approach (react to the user stumbling by giving more information each time). In a dialog manager providing this kind of service, multiple prompts may be stored with the same index value and expertise value. The dialog manager, searching for the prompt index, finds many possible utterances and, in the absence of an "expertise policy," chooses randomly among them.

Yet another feature of the dialog manager related to the selection of prompts is one which allows playback of recorded speech or other material at those times a prompt is required. This is be accomplished in practice either by searching the set of recorded segments against the prompt index as well as searching the user interface prompt data structure, or preferably, naming the recorded segment in the prompt string entry of the user interface prompt data of the appropriate index. The dialog manager, finding a file name, perhaps preceded by an escape character, will start the playback engine rather than the text to speech engine, through all the conventional actions previously described.

Accordingly, as described herein, the present invention provides a simple architecture, which by integrating the services of software engines providing elementary spoken languages services, can support the illusion of a collaborating verbal agent through support of spoken language dialog and services.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Apparatus for providing a spoken language interface between a user and at least one application or system, the apparatus operating in accordance with a computer processing system including a processor, an audio input system for receiving speech data provided by the user, an audio output system for outputting speech data to the user, a speech decoding engine and a speech synthesizing engine, the apparatus comprising:

a dialog manager operatively coupled to the application or system, the audio input system, the audio output system, the speech decoding engine and the speech synthesizing engine; and at least one user interface data set operatively coupled to the dialog manager, the user interface data set representing spoken language interface elements and data recognizable by the application;

wherein: (i) the dialog manager enables connection between the input audio system and the speech decoding engine such that the spoken utterance provided by the user is provided from the input audio system to the speech decoding engine; (ii) the speech decoding engine decodes the spoken utterance to generate a decoded output which is returned to the dialog manager; (iii) the dialog manager uses the decoded output to search the user interface data set for a corresponding spoken language interface element and data which is returned to the dialog manager when found; (iv) the dialog manager provides the spoken language interface element associated data to the application or system for processing in accordance therewith; (v) the application, on processing that element, provides a reference to an interface element to be spoken; (vi) the dialog manager enables connection between the audio output system and the speech synthesizing engine such that the speech synthesizing engine which, accepting data from that element, generates a synthesized output that expresses that element; and (vii) the audio output system audibly presenting the synthesized output to the user.

2. The apparatus of claim 1, further wherein: (i) the speech decoding engine is unable to decode the spoken utterance and returns error information to the dialog manager; (ii) the dialog manager uses the error information to search the user interface data set for a corresponding spoken language interface element which is returned to the dialog manager when found; (iii) the dialog manager enables connection between the audio output system and the speech synthesizing engine such that the speech synthesizing engine which, accepting data from that element, generates a synthesized output that expresses that element; and (iv) the audio output system audibly presenting the synthesized output to the user.

3. The apparatus of claim 1, wherein, at the start of execution, the dialog manager performs a default initialization of one or more parameters of the speech decoding engine in accord with one or more settings provided in a hardware profile data set.

4. The apparatus of claim 1, wherein the dialog manager is responsive to one or more additional engines associated with the computer processing system for providing speech related functions, the one or more engines also being operatively coupled to the dialog manager.

5. The apparatus of claim 4, wherein the one or more engines include at least one of a user verification engine, an audio recording engine and an audio playback engine.

6. The apparatus of claim 1, wherein the dialog manager addresses a foreground application.

7. The apparatus of claim 1, wherein the dialog manager addresses a background application.

8. The apparatus of claim 1, wherein progress of one or more operations of the dialog manager is reported to the application or system to inform the application or system that a requested service is complete and additional services may be requested.

9. The apparatus of claim 1, wherein the dialog manager comprises an engine manager component, the engine manager component being directly coupled to the speech decoding engine and the speech synthesizing engine and providing a messaging interface between the engines and the dialog manager.

10. The apparatus of claim 1, wherein the dialog manager comprises an interpreter component, the interpreter component being directly coupled to the user interface data set and providing a searching mechanism for the dialog manager.

11. The apparatus of claim 1, wherein the dialog manager causes a new user interface data set structure to be allocated and loaded with data in response to a request by an application or system.

12. The apparatus of claim 1, wherein the dialog manager causes a new element to be added to an existing user interface data set structure.

13. The apparatus of claim 1, wherein the user interface data set includes at least one of a vocabulary data file, a prompt data file, a script data file, and a profile data file.

14. The apparatus of claim 1, wherein the computer processing system is a personal computer.

15. The apparatus of claim 1, wherein the computer processing system is portable by the user.

16. The apparatus of claim 1, wherein the dialog manager is operative to maintain a history of use associated with an application.

17. The apparatus of claim 1, wherein the dialog manager is operative to maintain a history of use associated with a system feature.

18. The apparatus of claim 1, wherein the dialog manager is operative to maintain a history of use where an accumulated number of uses is recorded.

19. The apparatus of claim 1, wherein the dialog manager is operative to maintain a history of use where an accumulated number of uses is incremented until it reaches a predetermined value.

20. The apparatus of claim 1, wherein the dialog manager is operative to maintain a history of use where a time of last use is recorded.

21. The apparatus of claim 1, wherein the dialog manager is operative to select among prompts to find prompts of reducing complexity corresponding to the increasing accumulated experience of the user.

22. The apparatus of claim 1, wherein the dialog manager is operative to select among prompts to find prompts of complexity corresponding to a measure of the time since user's last experience with a system feature.

23. The apparatus of claim 1, wherein the dialog manager is operative to replace escape characters in prompt text with values provided in a prompt request message.

24. The apparatus of claim 1, wherein the dialog manager is operative to replace escape characters in prompt text with values provided in messages preceding a prompt request message.

25. The apparatus of claim 1, wherein the user interface data set includes at least one file providing default properties for the behavior of a physical interface.

26. The apparatus of claim 1, wherein user interface data set includes profiles associated with individual applications such that application presentation is customized.

27. The apparatus of claim 1, wherein the dialog manager forms a hierarchy of spoken addresses descending from the application, through the dialog manager, to the engines.

28. The apparatus of claim 1, further including means for searching a built-in command set of the dialog manager.

29. The apparatus of claim 28, further including means for searching the user interface data set in order from application to the operating system of the computer processing system to the dialog manager.

30. The apparatus of claim 1, wherein the dialog manager is responsive to changing the properties thereof by receiving commands described in the user interface data set.

31. The apparatus of claim 1, wherein the dialog manager is scaled by adding engines.

32. The apparatus of claim 1, wherein the dialog manager is scaled by adding scripts.

33. The apparatus of claim 1, wherein the dialog manager is scaled by adding vocabulary and prompt files.

34. The apparatus of claim 1, wherein the dialog manager is scaled by removing components.

35. The apparatus of claim 1, wherein the user interface data set is changed to match the active application.

36. The apparatus of claim 1, wherein a power state of components of the computer processing system is responsive to a command reflecting the activity of the dialog.

37. The apparatus of claim 1, wherein the user interface data set comprises synonyms in vocabulary files.

38. The apparatus of claim 1, wherein the user interface data set comprises prompts composed from strings and variables passed in a prompt service request message.

39. The apparatus of claim 1, wherein the user interface data set comprises prompts composed from strings and variables passed in messages preceding a prompt service request message.

40. The apparatus of claim 1, wherein the user interface data set comprises prompts composed from strings and prerecorded data.

41. The apparatus of claim 1, wherein progress of one or more operations of the dialog manager is reported to the application or system to inform the application or system that a requested service is complete.

42. The apparatus of claim 1, further including means for searching the at least one user interface data set in a predetermined order.

43. A method for providing a spoken language interface between a user and at least one application or system, the method comprising the steps of:

enabling connection between an input audio system and a speech decoding engine such that a spoken utterance provided by the user is provided from the input audio system to the speech decoding engine;

decoding the spoken utterance to generate a decoded output which is returned to a dialog manager;

using the decoded output to search a user interface data set for a corresponding spoken language interface element and data which is returned to the dialog manager when found;

providing the spoken language interface element associated data to the application or system for processing in accordance therewith;

the application, on processing the spoken language interface element, providing a reference to an interface element to be spoken;

enabling connection between an audio output system and a speech synthesizing engine such that the speech synthesizing engine which, accepting data from that element, generates a synthesized output that expresses that element; and audibly presenting the synthesized output to the user.

44. An article of manufacture for providing a spoken language interface between a user and at least one application or system, comprising a machine readable medium containing one or more programs which when executed implement the steps of:

enabling connection between an input audio system and a speech decoding engine such that a spoken utterance provided by the user is provided from the input audio system to the speech decoding engine;

decoding the spoken utterance to generate a decoded output which is returned to a dialog manager;

using the decoded output to search a user interface data set for a corresponding spoken language interface element and data which is returned to the dialog manager when found;

providing the spoken language interface element associated data to the application or system for processing in accordance therewith;

the application, on processing the spoken language interface element, providing a reference to an interface element to be spoken;

enabling connection between an audio output system and a speech synthesizing engine such that the speech synthesizing engine which, accepting data from that element, generates a synthesized output that expresses that element; and audibly presenting the synthesized output to the user.

* * * * *